United States Patent [19]
Broadbent

[11] Patent Number: 5,749,264
[45] Date of Patent: May 12, 1998

[54] GEAR CHANGE MECHANISM

[75] Inventor: Roland James Broadbent, Banbury, England

[73] Assignee: Prodrive Engineering Limited, North Wales, England

[21] Appl. No.: 581,568

[22] PCT Filed: Jul. 18, 1994

[86] PCT No.: PCT/GB94/01553

§ 371 Date: Jan. 16, 1996

§ 102(e) Date: Jan. 16, 1996

[87] PCT Pub. No.: WO95/02775

PCT Pub. Date: Jan. 26, 1995

[30]  Foreign Application Priority Data

Jul. 17, 1993 [GB] United Kingdom ............... 9314951.6

[51] Int. Cl.$^6$ ............................................. F16H 51/00
[52] U.S. Cl. ......................... 74/335; 74/336 R; 477/77
[58] Field of Search ......................... 74/335, 336 R, 74/483 R, 473 R; 477/77, 79, 80

[56] References Cited

U.S. PATENT DOCUMENTS

| | | | |
|---|---|---|---|
| 5,191,804 | 3/1993 | Genise | 74/335 |
| 5,417,124 | 5/1995 | Huff et al. | 74/335 |
| 5,473,959 | 12/1995 | Lasoen | 74/335 |
| 5,560,255 | 10/1996 | Willford et al. | 74/335 X |
| 5,566,579 | 10/1996 | Willford et al. | 74/335 |

FOREIGN PATENT DOCUMENTS

| | | | |
|---|---|---|---|
| 0060390 | 2/1982 | European Pat. Off. | B60K 20/10 |
| 0142221 | 8/1984 | European Pat. Off. | B60K 41/22 |
| 0651214 | 10/1937 | Germany | 63/20 |
| 3513279 | 4/1985 | Germany | B60K 41/06 |
| 9401553 | 7/1994 | WIPO . | |

OTHER PUBLICATIONS

Actuator is Key to Better Automatics; Apr. 13, 1993, No. 4, Horton Kirby, Author, pp. 26–28.

*Primary Examiner*—Khoi Q. Ta
*Assistant Examiner*—Peter T. Kwon
*Attorney, Agent, or Firm*—Oppenheimer Poms Smith

[57]  ABSTRACT

An improved gear change mechanism is provided for semi-automatically selecting a change up or change down gear change. The mechanism includes a shaft (31) which is movable in its axial direction and about its axis to make one such movement or a combination of such movements according to the gear to be selected. The shaft (31) is moved by pistons (36, 37) coaxial with the shaft for the axial movement and a piston (46) at a right angle to the shaft for the rotational movement. In practice the axial movement is a translating movement and the rotary movement is a movement into and out of engagement with the gears. Throttle and clutch control functions are also provided so that a gear change is initiated and brought about by switches (19A and 19B).

16 Claims, 5 Drawing Sheets

GEAR CHANGE MECHANISM

This invention relates to gear change mechanisms and particularly to arrangements for mechanisms for semi-automatically selecting the gear ratio for a gearbox.

Road vehicles conventionally include a gearbox in which different gear ratios are selected either automatically using torque converters or other mechanisms whereby gear changes are made without direct intervention by the driver, or manually using a gear lever and an associated clutch. In the latter arrangements the gears are arranged conventionally in an H pattern arrangement with the gear selection lever passing through a neutral position for every gear change effected by the driver. During each manual gear change the driver uses a drive clutch to the gearbox and an engine throttle to effect a smooth gear change. To assist in changing gear the gearbox is provided with a synchromesh system.

In European patent publication No. 0350812 there is disclosed a gear change mechanism in which a shaft is moved axially and about its axis by pistons and in which there is automatic control of the clutch mechanism.

An object of the invention is to provide an improved gear change mechanism whereby, using a substantially conventional gearbox, gears can be changed more easily with the possibility of quicker, more trouble-free gear selection.

According to one aspect of the invention a gear change mechanism for a gearbox comprises a drive assembly connectable to the gearbox gear selector, an actuator for actuating the drive assembly, and control means for controlling the operation of the drive assembly according to instructions received from the actuator and programming of the control means; the drive assembly including a shaft drivingly connectable to the gearbox selector, the shaft being movable in its axial direction and about its axis to move to a plurality of positions according to the gear to be selected in the gearbox.

Preferably the shaft is driven in its axial direction by a piston or pistons coaxial with the shaft, pressure fluid being applied selectively to the piston or pistons to move the pistons and the shaft in said axial direction.

The shaft may be movable about its axis by a further piston or pistons movable in a direction at a right angle to and spaced from the axis of the shaft, movement of said piston or pistons being transmitted to the shaft by a coupling whereby the shaft is rotated about its central axis.

The drive assembly and the control means are so arranged that upon actuation of a gear change the shaft is first moved in its axial direction from a gear selected position towards a neutral position in which no gear is selected. Thereafter the shaft may be moved axially from a neutral position to a further gear selected position, or the shaft may be rotated whilst in the neutral position before making an axial movement towards a further gear selected position. The kind of movement made by the shaft will depend on the gear to be selected, for example, in a conventional gearbox layout, movement between first and second gear will be by axial movement only, through the neutral position, whereas a change up from second gear to third gear will comprise an axial movement to neutral, followed by a rotational movement of the shaft whilst in neutral and followed by a further axial movement of the shaft in the same direction as the first axial movement. Changing down will, of course, involve the same movements in reverse order.

Valve arrangements are provided to effect the movement of the shaft in the desired sequence according to the operation of the actuator and the way the control means is arranged.

Preferably the gear change mechanism is actuated by an actuator which includes switch means which selects a change up or a change down mode. Conveniently there are separate switch means for each mode of operation.

In one arrangement the switch means for a road vehicle is carried on the vehicle steering wheel and conveniently the change up switch means is carried on one side of the steering wheel and the change down switch means is carried on the opposite side of the steering wheel.

When the switch means is steering wheel mounted, or otherwise, transmission of switch signals from the switch means to the gear change control may be by means of a transmitter associated with the switches on the steering wheel which transmits a signal, for example an infra-red signal, to a receiver mounted on a fixed point of the vehicle, for example the fascia. The receiver then passes the signals to the control means for initiation of a gear change operation.

To further improve the operation of the gear change there may be associated with the mechanism a clutch control arrangement which is operated by the control means when a gear change is to be effected, the clutch control mechanism disengaging drive to the gearbox from the engine when a gear change is to be effected. Preferably the clutch control arrangement operates in series with a conventional clutch operation by the driver and is arranged to override the conventional clutch when a gear change is actuated. Alternatively the clutch control arrangements may be the sole means for disengaging drive from the engine to the gearbox.

As a further feature the mechanism may include a throttle control mechanism which overrides the conventional throttle control, manually operated by the driver, when a gear change is to be made. The throttle control mechanism is intended to automatically produce a throttle reduction function normally effected by the driver during a gear change, upon the actuation of a gear change function. The throttle control arrangement may take the form of a drive mechanism, operated by the control means, which serves to reduce the throttle setting for the engine upon actuation of the gear change by reduction in the tension of the throttle linkage. This may be by interposing in the linkage a pulley around which the linkage passes, the pulley being moved by the drive means in a tension reducing direction.

As a further feature of the throttle control there may be provided means for temporarily increasing the throttle setting during a change from a higher gear to a lower gear to effect a smoother change down and, possibly, eliminate the need for synchromesh on the gearbox.

Operation of the throttle control and the clutch control may be by control means which is programmed to control such operation according to the gear change to be effected. The control means may also have regard to the road speed of the vehicle and the engine speed to determine the operations to be performed for each gear change and, in some cases, whether the selected gear change can be effected.

Although there is described a gear change mechanism suitable for automobiles it will be appreciated that the mechanism may find application in other vehicles including commercial vehicles, boats, tractors, earth moving equipment etc., and in other drive systems in which gearboxes are employed under manual control.

Further features of the invention will appear from the following description of an embodiment of the invention given by way of example only and with reference to the drawings, in which.

Figure 1:
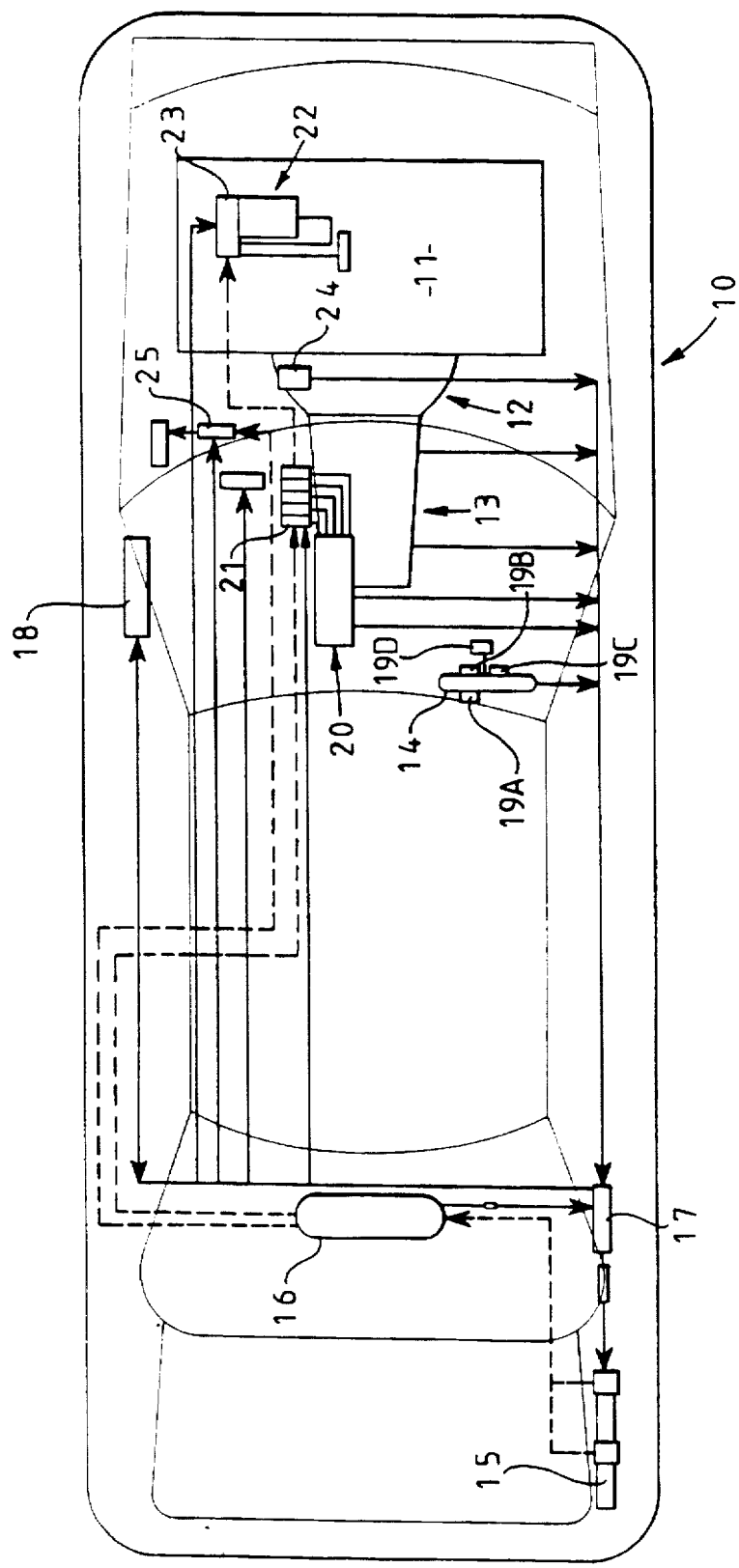
FIG. 1 is a plan view showing schematically the control arrangements and power supply of the gear change mechanism.

Referring to the drawings there is shown a gear change mechanism and associated control and drive systems which are suitable for use in an automobile having an otherwise conventional engine and transmission arrangement.

In FIG. 1 is shown the automobile 10 having an engine 11, clutch 12, gearbox 13 and steering wheel 14. In the illustrated mechanism the drive system is pneumatically operated and includes a compressor 15 supplying a reservoir 16 of pressurised air. An electronic control unit 17 for the gear change mechanism is fitted to the vehicle which is additional to the vehicle's own electronic control unit 18.

A drive mechanism 20 associated with the gearbox 13 is pneumatically powered through valves 21 from the reservoir 16 and a throttle control mechanism 22 is also powered through valves 23 from the reservoir 16. A clutch control mechanism 24 is associated with the clutch 12 and is also powered through a valve 25 from the reservoir 16.

The steering wheel 14 carries actuating switches (not shown) operatively connected to the electronic control unit 17 and there are provided further sensors connected to the control unit 17 for detecting:

input shaft speed to the gearbox 13 road speed of the vehicle clutch pressure pressure of air in the reservoir 16 the position taken up by the drive mechanism 20 for the gearbox.

Signals relating to each of the functions detected by the sensors are transmitted to the control unit 17 which is programmed to assemble information and instruct the mechanism to operate according to the signals received. In addition the control unit receives signals from the vehicle's control unit 18 and may transmit signals to this control unit 18. The functions offered by the control unit 17 will become more apparent in the following description.

The vehicle is fitted with the usual throttle control (accelerator pedal) (not shown) gear operating lever (not shown) and clutch control (not shown) which can be operated in conventional manner in case of failure of the gear selection mechanism, or otherwise. Alternatively the gear operating lever and clutch control may be omitted.

Actuation of a gear change is effected from the vehicle steering wheel 14 by the vehicle driver. The steering wheel is fitted with several switches, a set of switches 19A on one side of the steering wheel facing the driver and another set 19B of switches on the other side of the steering wheel. One set of switches is for changing the gears up and the other set is for changing down. The switches 19A and 19B are arranged to be accessible to the driver without being inadvertently operated.

The sets of switches 19A and 19B are associated with a transmitter 19C so that upon operation of a switch 19A or 19B a signal is transmitted which is received by a receiver 19D mounted on a fixed part of the vehicle, for example on the vehicle fascia. The transmitter/receiver arrangement 19C and 19D utilises infra-red medium but the arrangement may use radio signals. Alternatively the switches may be direct-wired to send actuation signals to the electronic control unit 17.

The drive mechanism 20 or actuator for the gearbox 13 is shown in detail in FIGS. 2–5. The mechanism 20 is powered pneumatically by air from the reservoir fed through a five valve system 21. The mechanism 20 includes an outer housing 30 providing ports (not shown) for the introduction and discharge of air and within the housing 30 is located a central shaft 31 which is connected at one end to the gearbox 13 in conventional manner. In the drawing, FIG. 2, the connection to the gearbox is made at the left hand end, but the connection may be made at either end of the shaft 31. The shaft 31 connects with a gearbox input lever 33 of conventional form and, for illustration purposes, there is shown a typical gearbox layout 35 which the mechanism of FIG. 2 can operate.

The layout 35 serves a six speed gearbox having five forward gears and a reverse gear, the layout being of standard H pattern having an additional arm for the fifth and reverse gears. Of the gears, gears 1 and 2, gears 3 and 4 and reverse and fifth gears are opposite one another, there being a neutral position between each of the pairs of gears and along the cross of the H in conventional manner. Other gear arrangements can also be accommodated by the drive mechanism 20 but the following description is in relation to the illustrated arrangement.

The shaft 31 is movable in its axial direction and is rotatable about its axis. Separate drive means is provided for each of the axial and rotational movements. In the illustrated arrangement, for each axial movement, the shaft 31 is capable of taking up any one of three positions and by a combination of these positions any one of the gears may be selected.

The drive means for the axial movement includes a pair of pistons 36 and 37 located to opposite sides of a portion 38 of the shaft 31 which is of enlarged diameter, the pistons 36, 37 having limited axial movement relative to the shaft 31. Located around the enlarged portion 38 of the shaft 31 is a sleeve 39 which is fixed in relation to the shaft housing 30 but the shaft 31 is slidable relative to the sleeve 39.

To accommodate the pistons 36 and 37 and the sleeve 39 the housing 30 is formed with a cylindrical chamber 40, and at opposite ends of the chamber 40 are formed annular recesses 41 in which are locatable collars 42 and 43 axially fixed on the shaft 31.

Air inlet and outlet ports (not shown) are provided in the casing to admit and discharge air to move the pistons 36, 37 and collars 42, 43 along the chamber 40 and hence move the shaft 31 in the axial direction. Air supply to the ports is from the air valves 21 (FIG. 1).

Figure 2:
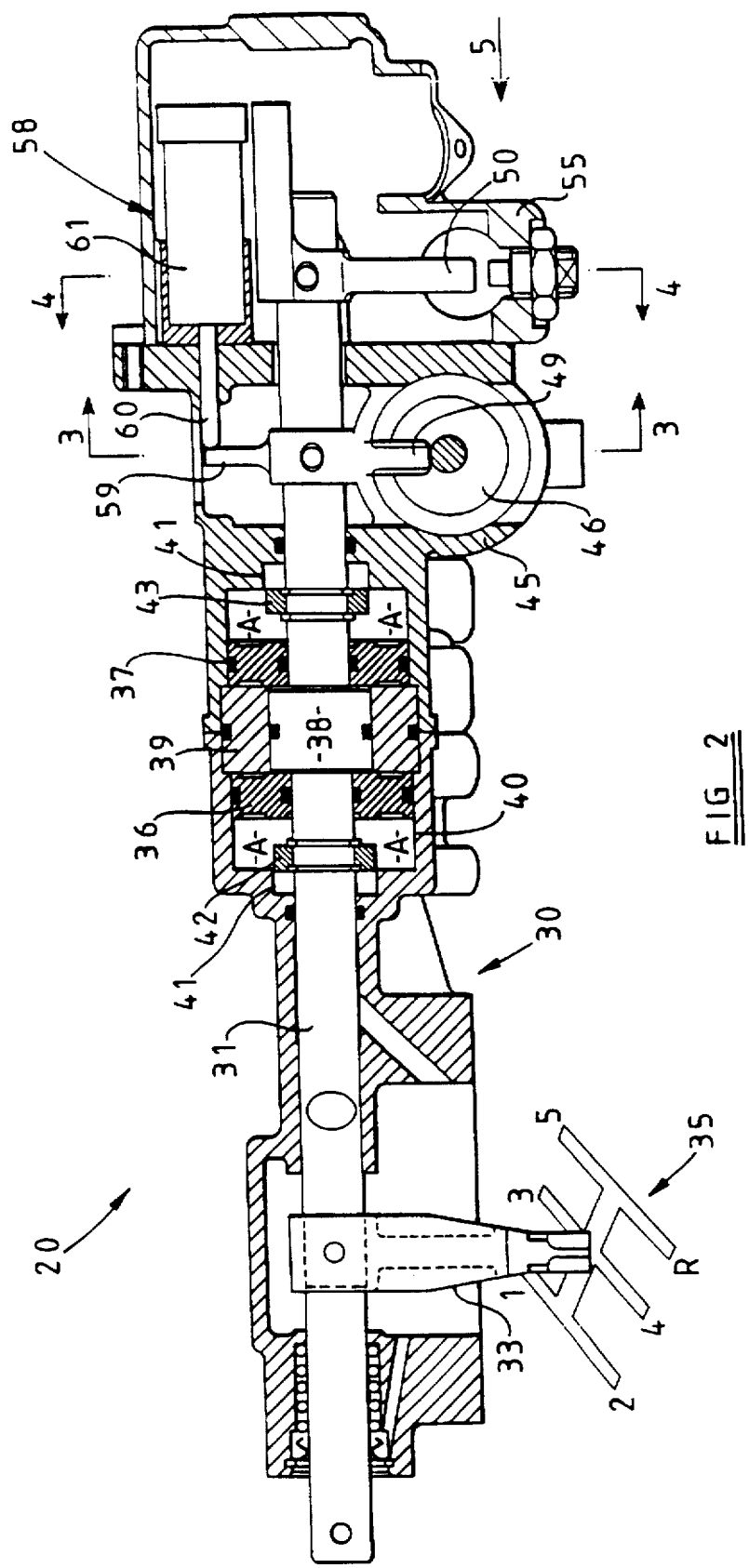
FIG. 2 is a vertical section through a drive assembly for a gearbox.

In FIG. 2 the shaft 31 is in its central, neutral position at which none of the gears are selected. In this position chambers A to the sides of the pistons 36, 37 are fed with air from the same valve so that the air pressures are equal. In this position each piston 36, 37 is engaged with a shoulder of the enlarged portion 38 of the shaft 31 and with opposite sides of the sleeve 39.

To move the shaft 31 from this position air is introduced into one of the chambers which lie between the associated piston 36 or 37 and the side of the sleeve 39 adjacent this piston. This causes the piston 36 or 37 to move outwards away from the sleeve 39 and into engagement with the associated collar 42 or 43, causing the shaft 31 and the collar 42 or 43 to move to the left or to the right until the piston is at an extreme end of the chamber 40 and the collar 42 or 43 is located in its associated recess 41. This action enables the pistons 36 and 37 to drive the shaft 31 to either one of its axial end positions in which the piston 36 or the piston 37 is at the end of the chamber 40. The entry of air into the chambers A returns the shaft to the neutral central position by movement of the pistons 36, 37 to the FIG. 2 positions.

By arranging the control unit accordingly the movement of the shaft to its end positions from its neutral position can be in two stages, a first fast initial movement and a slower second movement in which the full movement is completed, thereby enabling the gear speeds to be matched within predetermined limits before the gears are fully meshed and allowing for the synchromesh to operate, or to obviate the requirement for the synchromesh facility in the gearbox.

For a rotational movement of the shaft 31 a separate drive arrangement is provided. This includes a housing 45 for a piston 46 whose axis extends at a right angle to the axis of the shaft 31 and is spaced therefrom. The housing 45 defines a chamber 47 in which the piston 46 is movable and air is introduced into the chamber through ports (not shown) and from the air valve 21 (FIG. 1). At a centre portion of the piston 46 there is formed a peripheral groove or channel 48 in which is located a finger 49 coupled to the shaft 31.

Upon movement of the piston 46 between the ends of the chamber 47 the shaft 31 is rotated about its axis, the outer end of the finger 49 engaging in the groove 48 and being shaped to rock or pivot in the groove 48 as the piston is moved and the finger 49 also being axially movable relative to the piston 46 along the groove 48.

Figure 3:
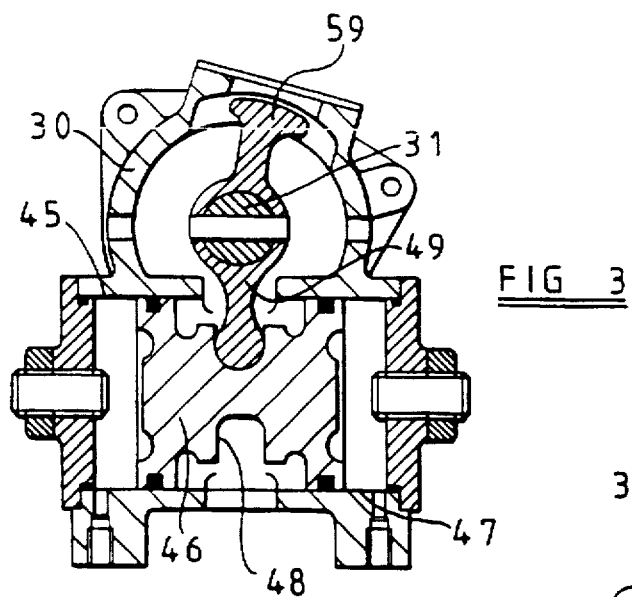
FIG. 3 is a section through the drive assembly of FIG. 2 on the line 3—3.

As shown in FIG. 3 the piston 46 is in its central position in which gears 3 and 4 may be selected. When the piston 46 is in the left side position two other gears may be selected, and in the right side position the final two gears may be selected.

Figure 4:
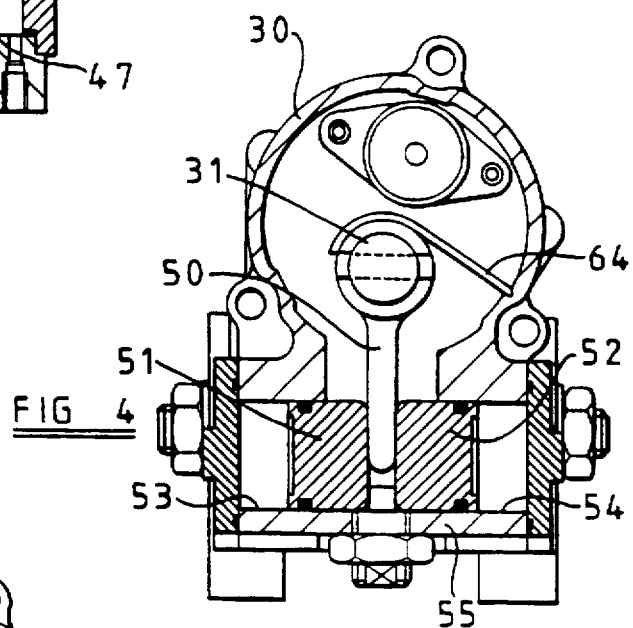
FIG. 4 is a section through the drive arrangement of FIG. 2 on the line 4—4.
Figure 5:
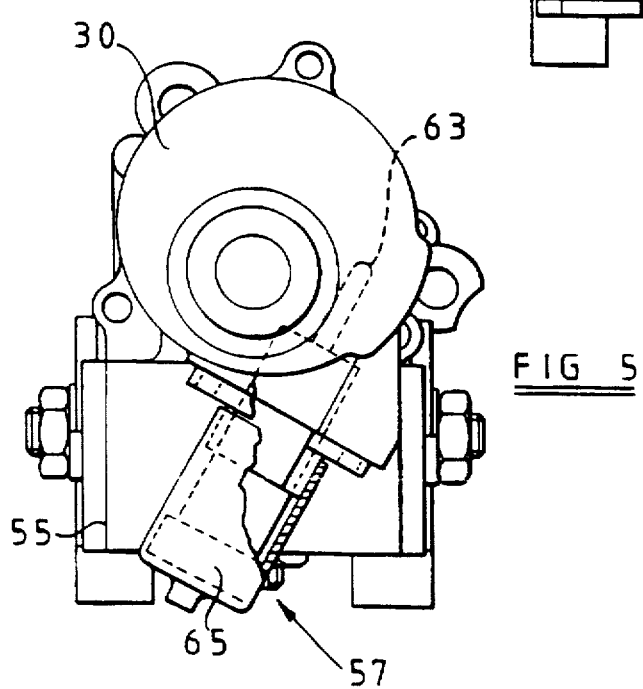
FIG. 5 is an end view of the drive assembly of FIG. 2 in the direction of arrow 5.

Referring now to FIG. 4 there is provided biasing means for biasing the shaft 31 towards the centre of the gate of the gearbox to obviate the need for the spring biasing system conventionally fitted to the gearbox. An arm 50 is connected to the shaft 31 and is engaged on opposite sides by pistons 51 and 52. The pistons 51 and 52 are located in cylinders 53 and 54 formed by a housing 55 and the cylinders 53 and 54 each communicate with an air supply from the valves 21. Equal air pressures are supplied to each of the cylinders 53 and 54 and an adjustable valve (not shown) is provided to adjust the air pressure in the cylinders to vary the degree of bias provided.

The arm 50 is movable axially of the pistons 51, 52 according to the axial position of the shaft 31.

Linear sensors are provided on the drive mechanism to sense at any one time the position of the shaft 31 and hence the position of the gear selection arrangement and the gear selected. Two sensors are provided, one 58 for sensing the axial position of the shaft and the other 57 for detecting the rotational position of the shaft 31.

The sensor 58 includes a probe 60 which is biased into engagement with the end 59 of the finger 49 remote from the piston 46, the finger 49 moving in the axial direction upon movement of the shaft 31. The probe 60 is associated with a positional detector 61 which senses the position of the probe 60 to supply a signal to the control unit 17 according to the position of the probe 60.

The sensor 57 (FIG. 5) includes a probe 63 which engages a blade 64 attached to the shaft 31, the probe 63 and the blade 64 extending tangentially to the shaft 31 and substantially at right angles to one another. The probe 63 is associated with a positional detector 65 so that as the shaft rotates the probe is moved in and out against a spring bias, and the detector 65 transmits a signal to the control unit 21 according to the rotational position of the shaft 31.

Figure 6:
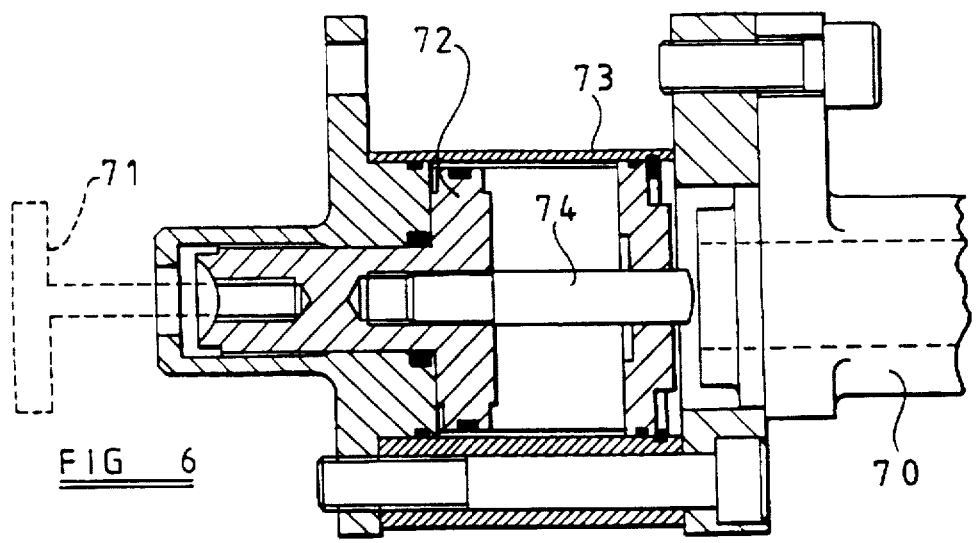
FIG. 6 is a sectional view of a clutch control mechanism.

The gear changing arrangement includes a clutch control system whereby the clutch is automatically operated upon actuation of the gear change mechanism. The clutch control system is shown in FIG. 6 and the clutch control system is fitted to the existing clutch master cylinder 70 and is interposed between the conventional clutch operating pedal, shown schematically at 71, and the standard clutch, i.e. in series.

The mechanism comprises a piston 72 movable in a cylinder 73, the piston 72 having an operating rod 74 operable to actuate the clutch through the master cylinder 70. Thus when the piston 72 is moved along the cylinder 73 by the introduction of pressurised air into the cylinder the piston moves along the cylinder to cause the rod to operate the clutch. Introduction of air to the opposite side of the piston 72, i.e. to the right as seen in FIG. 6, causes the clutch to be disengaged. However it will be seen that the clutch can be operated normally through use of the clutch pedal 71, if necessary.

Introduction of air to and from the cylinder 73 is through valve 25 which is actuated by the control unit 17 in conjunction with the operation of the gear selection. The control unit ensures that the clutch is disengaged to effect a gear change and re-engage as soon as the gear change is completed. By monitoring the speed sensors and a pressure sensor in the clutch the control unit determines the correct moments for actuating the clutch control unit.

Figure 7:
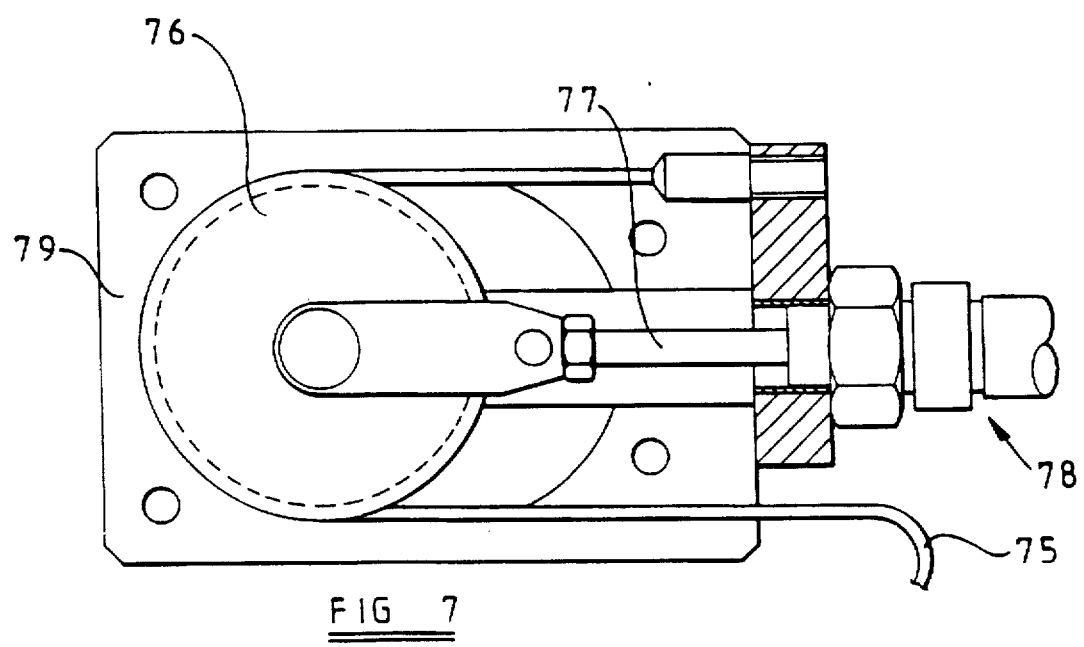
FIG. 7 is a plan view in section of a throttle control mechanism.
Figure 8:
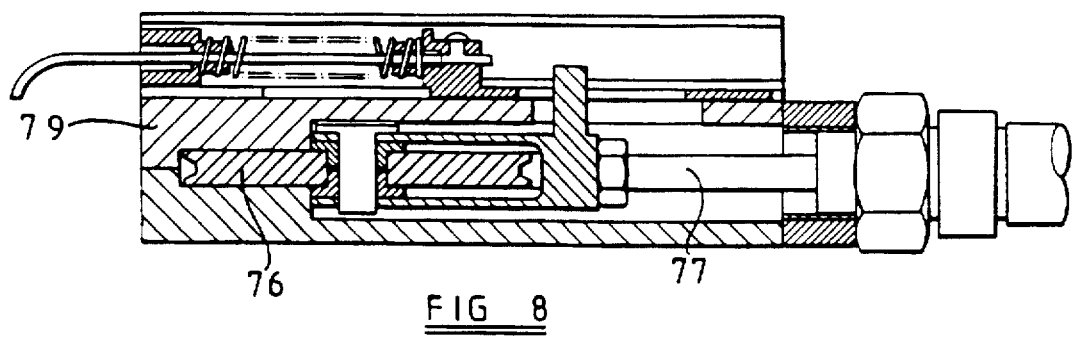
FIG. 8 is a vertical section of the mechanism of FIG. 7.
Figure 9:
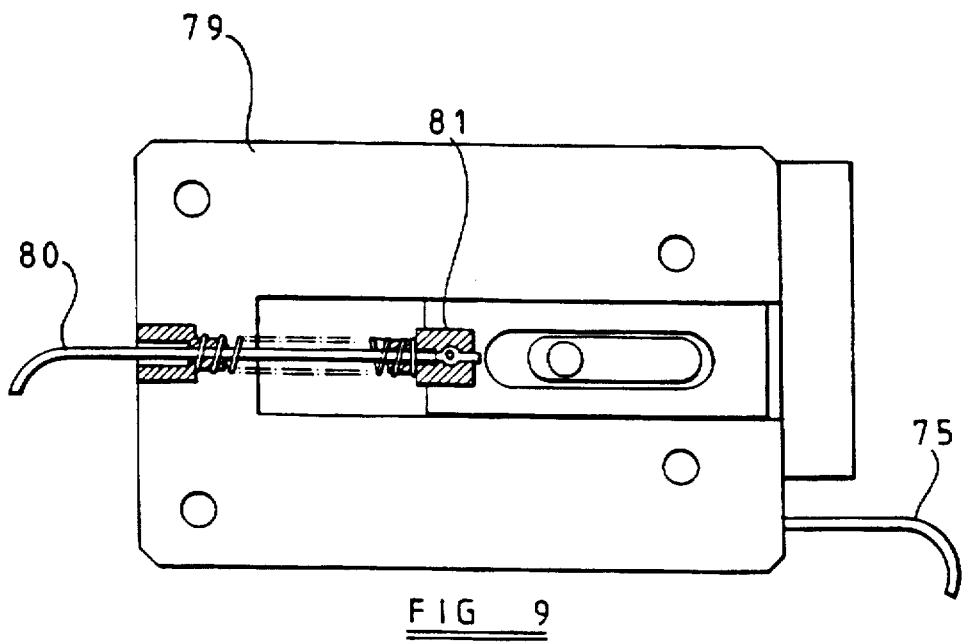
FIG. 9 is a plan view of the mechanism of FIG. 7.

There is also provided a throttle control unit, FIGS. 7-9. The throttle control unit is interposed in the linkage between the accelerator pedal of the vehicle and the throttle and it is arranged to have the effect of releasing tension in the throttle linkage and hence causing the throttle to move to a zero setting irrespective of the position of the accelerator pedal.

The throttle linkage 75 is taken around a pulley 76 which is carried on the piston rod 77 of a pneumatic piston and cylinder 78. Operation of the piston and cylinder 78 to retract the piston rod 77 into the cylinder causes the pulley to move along guides in a housing 79 thereby removing tension in the linkage 75. When a gear change is completed and as instructed by the control unit 17 the piston rod 77 is extended from the cylinder and tension in the linkage 75 is restored in a gradual and controlled manner. A manual override facility is provided by the cable 80 and slide 81.

As a further feature of the throttle control arrangement there is provided means whereby the throttle may be temporarily opened during a gear change operation. This is primarily to increase engine speed during a change down gear change to enable the speed of the engine to be matched with the gear speed. To bring about a temporary throttle increase there is provided a pneumatic cylinder (not shown) which operates directly on the throttle mechanism of the engine. By this means smooth gear changes may be achieved.

It will be appreciated that the gear change arrangement described is capable of providing semi-automatic gear change under the control of the driver but without the driver having to use the clutch, throttle or gear lever of the vehicle. The driver selects whether a gear change is to be made which is an up or a down gear change and very rapidly the arrangement is capable of effecting the gear change selected. By the use of the control unit all parameters of the gear change can be monitored and controlled to effect a quick and smooth gear change in either direction. It has been found that the gear change is so controlled that it may be possible to omit the synchromesh normally provided on the gearbox with resulting savings in cost and weight. Savings in fuel consumption can also be achieved compared with other automatic gearboxes by reduction in the losses incurred in torque converters and similar mechanisms. The control unit can also be arranged to prevent gear changes being attempted which are not programmed into the control unit and, in particular, gear changes which would be mechanically damaging, unnecessary or inefficient.

One advantage of the gear change arrangement is that it can be fitted to existing vehicles or vehicles retaining existing gearboxes and other drive arrangements but it can also be used in arrangements in which the gearbox is substantially modified for simplification and cost saving. For example the gearbox may be modified by omitting any synchromesh. Moreover the control unit may be arranged to obviate the need for any manually-operated clutch, even when the vehicle is moving off from rest and stopping, using the road speed sensor.

As a further alternative the gear change arrangement may be made automatic by programming the control unit to match engine and road speed having regard to throttle setting and to initiate gear changes according to such programming. If desired the option of manual control, as described, may be retained in an otherwise automatic gear change arrangement.

I claim:

1. A gear change mechanism for a gearbox (13, 35) which comprises a drive assembly (11, 12), a gearbox selector (33) connectable to the drive assembly, an actuator (19A, 19B, 19C, 19D) for actuating the drive assembly; and control (17) means for controlling the operation of the drive assembly according to instructions received from the actuator and according to programming of the control means;

the drive assembly including:

a shaft (31) drivingly connectable to the gearbox selector (33), the shaft being movable in its axial direction and about its axis to move a plurality of positions according to the gear to be selected in the gearbox (35) and a neutral gear position;

a first piston assembly (36–43) wherein the shaft (31) is operatively driven in its axial direction by the first piston assembly which is coaxial with the shaft, pressure fluid being applied selectively to the first piston assembly to move the shaft in the axial direction;

the first piston assembly comprising a pair of collars (42, 43) acting as first abutment means restricting the axial movement of the shaft (31) and a pair of annular pistons (36, 37) located about the shaft and each piston is movable selectively towards a gear engaging position and towards a neutral gear position;

a cylinder (40) comprising a pair of recesses (41) located at opposite ends of the cylinder (40) walls to engage with the collars (42, 43);

second abutment means (39) carried by the cylinder (40), the movement of each piston (36, 37) towards a neutral gear position being limited by the second abutment means (39), and during said movement each piston (36, 37) is engageable with the second abutment means (39) which is located between the pistons, and pressure fluid being applied to opposite sides of the pistons to urge the pistons towards the neutral gear position, the first abutment means (42, 43) acting upon movement in the gear engaging direction.

2. A gear change mechanism according to claim 1 wherein each piston is movable by pressure fluid in said cylinder and, in the gear engaging position, each piston is movable into engagement with said first abutment means mounted on the shaft to move the shaft in said axial direction by a predetermined limited amount.

3. A gear change mechanism according to claim 2 wherein the movement of each piston in a gear engaging direction is limited by said first abutment means having limited travel.

4. A gear change mechanism according to claim 1 comprising a second piston assembly whereby the shaft is movable about its axis, the second piston assembly being movable in a direction at a right angle to and spaced from the axis of the shaft, and a coupling whereby movement of said second piston assembly is transmitted to the shaft to rotate the shaft about its axis.

5. A gear change mechanism according to claim 4 wherein said second piston assembly for moving the shaft about its axis comprises a double acting piston located within a cylinder and said coupling comprises a finger supported for pivoting relative to the piston, said finger being mounted for rotation with said shaft and directed outwardly of said shaft.

6. A gear change mechanism according to claim 5 wherein said second piston assembly coupling includes relatively slidable members whereby the shaft is axially movable relative to the assembly.

7. A gear change mechanism according to claim 6 wherein the relatively slidable members include a rotatable finger mounted on the shaft and connected to a piston of the second piston assembly through a slidable connection.

8. A gear change mechanism according to claim 1 comprising pressure fluid controlled biasing means whereby the shaft is biased towards a neutral gear position.

9. A gear change mechanism according to claim 8 wherein said biasing means comprises a fluid pressure controlled second piston assembly connected to the shaft through an arm, said fluid pressure controlled second piston assembly comprising piston means and the same pressures being applied to opposite sides of the piston means to bias the shaft towards said neutral position.

10. A gear change mechanism according to claim 1 wherein the actuator includes switch means having a first switch which selects a change up gear change and a second switch which selects a change down gear change, actuation of one or other switch being transmitted to the drive assembly according to the operation of the control means.

11. A gear change mechanism according to claim 10 wherein the switch means is carried on a vehicle steering wheel and the first is located on one side of the steering wheel, the second switch for effecting a change down gear change being carried on the opposite side of the steering wheel.

12. A gear change mechanism according to claim 11 comprising a transmitter for transmission of switch signals from the switch means to the control means, and a receiver which receives a signal from the transmitter, the receiver being fixedly mounted on the vehicle, the signal being an infra red signal or radio signal.

13. A gear change mechanism according to claim 1 comprising a clutch control arrangement operable by the control means to disengage drive to the gear box from the engine upon actuation of the switch means and to re-engage drive when the selected gear change has been effected.

14. A gear change mechanism according to claim 13 wherein the clutch control arrangement is arranged in series with a manually operated clutch and is arranged to override the manually operated clutch when actuation of a gear change is effected.

15. A gear change mechanism according to claim 1 comprising a throttle control which overrides a manually operated throttle when a gear change is actuated by the switch means, the throttle control effecting a throttle reduction to reduce the throttle setting.

16. A gear change mechanism according to claim 15 wherein the throttle control includes means for temporarily increasing the throttle setting when a change down gear change instruction is received by the control means.

* * * * *